Aug. 30, 1949.         R. E. FEARON         2,480,808
MULTIGRID IONIZATION CHAMBER
Filed May 18, 1948
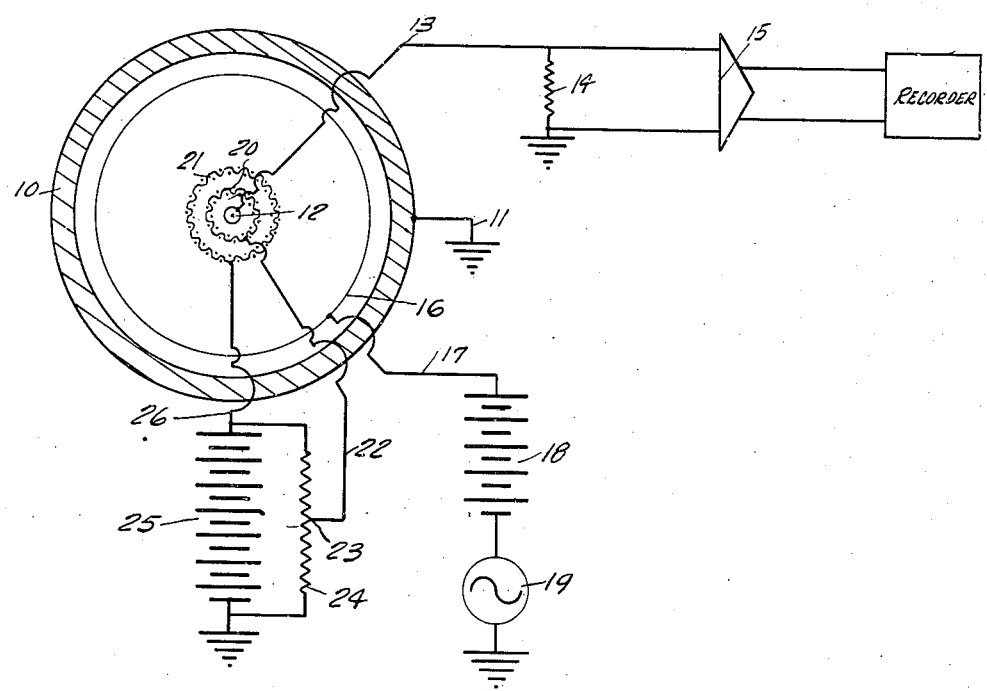
INVENTOR.
ROBERT EARL FEARON
BY
James Y. Cleveland
AGENT OR ATTORNEY Patented Aug. 30, 1949

2,480,808

UNITED STATES PATENT OFFICE 2,480,808

MULTIGRID IONIZATION CHAMBER

Robert Earl Fearon, Tulsa, Okla., assignor to Well Surveys, Incorporated, Tulsa, Okla., a corporation of Delaware Application May 18, 1948, Serial No. 27,772

3 Claims. (Cl. 250—27.5)

This invention relates to an improvement in ionization chambers and more particularly to an improved ionization chamber adapted to measure radioactive radiation and which produces indications in the form of alternating currents or voltages.

Prior to the present invention, it has been known to construct an ionization chamber by positioning a pair of electrodes in a sealed chamber containing an inert gas and placing sufficient direct current potential across the electrodes so that a current would flow between the electrodes, the magnitude of which would depend upon the intensity of radioactive radiation to which the chamber was subjected.

Because the current flow was small and the changes in its magnitude were also small, it was necessary to amplify the signals received from the ionization chamber in order to produce signals large enough to be observed or recorded. For this purpose it was necessary to use direct current amplifiers and serious problems were encountered because of the tendency of such amplifiers to drip and produce irregular or unreliable amplification.

A few years back, a method of measuring the small signals from an ionization chamber by a null method was devised and patented by Scherbatskoy, Patent No. 2,219,274, granted October 22, 1940. Even this system, however, had the disadvantage of being relatively complex and requiring a considerable amount of apparatus.

According to the present invention, the difficulties experienced with the prior art have been overcome by the provision of a sensitive, reliable ionization chamber that produces signals accurately indicative of the intensity of radioactive radiation, in the form of an alternating current of predetermined frequency.

Any attempt to obtain alternating current signals from an ionization chamber by simply supplying an alternating current potential across the electrodes of an ordinary ionization chamber fails completely, because the ionization chamber acts as a condenser and passes so much of the alternating current applied to the electrodes that the current so passed completely masks any signals indicative of radioactive radiation.

By calculation and experimentation, it has now been found that by the use of at least two concentric grids surrounding the inner electrode of an ionization chamber, and by maintaining these grids at the proper potentials, and by the application of a combined alternating and direct current potential across the electrodes, alternating current signals truly indicative of the intensity of radioactive radiation can be produced. Such signals may be simply and easily amplified by alternating current amplifiers which are sturdy and dependable. The signals thus produced are accurate indications for observation or recording, of the signals generated by the ionization chamber, which in turn accurately represent the intensity of the radioactive radiation to which the ionization chamber is exposed.

A more complete understanding of the principles as well as the details of this invention may be had by a consideration of the following detailed description of a preferred embodiment of this invention, and by reference to the appended drawings.

In the drawing the single figure is a cross-sectional view through an ionization chamber, constructed in accordance with this invention, together with a circuit diagram of the electrical circuit into which the various elements of the ionization chamber are connected.

As illustrated in the drawing, the ionization chamber of this invention preferably consists of a structurally strong outside container 10 in which are mounted the various elements of the ionization chamber, appropriately insulated from each other and from the casing 10 and connected through insulated connections into the external circuit. The casing 10 is preferably filled with an inert gas such as argon under a relatively high pressure such as two to five hundred pounds per square inch. Lower pressures have been used and pressures as high as fifteen to eighteen hundred pounds have also been used. The casing 10 is preferably grounded, as illustrated, at 11.

Inside of the casing is positioned a central electrode 12 connected through a conductor 13 and a high resistance 14 to ground. The current flow through the central conductor thus produces a potential across the high resistance 14 which potential is amplified by alternating current amplifier 15 and conducted to a recorder or meter (not shown).

Current is supplied to the central electrode 12 through the gas in the container 10 from an outer or pail electrode 16 which, as shown, is cylindrical in shape and lies fairly close to the wall of container 10. This outer electrode 16 is connected by a conductor 17 to the positive terminal of a battery 18, the negative terminal of which is connected to one terminal of a source of alternating current 19, the other terminal being connected to ground. Thus the outer electrode 16 is supplied with a direct current potential plus an alternating current potential.

In order to prevent alternating current from passing directly through the ionization chamber by a capacity effect between the central electrode 12 and the outer electrode 16, a pair of concentric grids 20 and 21 are positioned so as to surround the inner or central electrodes 12 and lie relatively close thereto. The inner of these two grids 20 is connected by a conductor 22 to an intermediate point 23 on a resistor 24 which is shunted across a battery 25, the negative pole of which is connected to ground. The outer of the two grids (21) is connected by a conductor 26 to the positive pole of the same battery 25.

By this arrangement the inner grid 20 is at a positive potential with respect to the central electrode 12 and the outer grid 21 is at an even greater positive potential relative to the central electrode 12. If the potentials of these grids are properly adjusted with reference to the potentials of the central electrode 12 and the outer or pail electrode 16, it will be found that they exclude or prevent the passage of an appreciable amount of alternating current by capacity effect. They do not, however, exclude the passage of alternating current as a result of ionization caused by radioactive radiation. Therefore, the current passing to the central electrode 12 and through the conductor 13 and the high resistance 14 will depend upon the amount of ionization produced by the radioactive radiation, but will be an alternating current which can be amplified by the alternating current amplifier 15 and observed or recorded.

The exact potentials to be applied to the outer electrode and the two grids will, of necessity, be adjusted in accordance with the dimensions of the ionization chamber, the pressure and kind of gas used in the ionization chamber and the conditions under which the device is to operate.

While two concentric grids have been illustrated in the preferred embodiment shown in the drawing, it will be at once apparent that additional grids can be added and these grids positioned either close to the central electrode or close to the outer electrode or at some other point in the space between these electrodes, as may be found expedient. In its broadest aspect this invention contemplates the employment of any desired number of grid elements.

I claim:

1. An ionization chamber for the detection of radioactive radiations that comprises a pair of electrodes insulated from each other and at least two grids between said electrodes and insulated from said electrodes and from each other.

2. An ionization chamber for the detection of radioactive radiations that comprises a pair of inert gas under superatmospheric pressure, a pair of electrodes, insulated from each other and separated by said body of gas and at least two grids immersed in said body of gas between said electrodes and insulated from said electrodes and from each other.

3. An ionization chamber arrangement for the detection of radioactive radiations that comprises a pair of electrodes insulated from each other, means to supply an alternating current potential across said electrodes, at least two grids between said electrodes and insulated from said electrodes and from each other and means to supply a biasing potential to each of said grids.

ROBERT EARL FEARON.

No references cited.

Certificate of Correction

Patent No. 2,480,808

August 30, 1949

ROBERT EARL FEARON

It is hereby certified that error appears in the printed specification of the above numbered patent requiring correction as follows:

Column 4, line 20, for the word "pair" read *body*;

and that the said Letters Patent should be read with this correction therein that the same may conform to the record of the case in the Patent Office.

Signed and sealed this 31st day of January, A. D. 1950.

[SEAL]

THOMAS F. MURPHY,
*Assistant Commissioner of Patents.*